(12) United States Patent
Huegle et al.

(10) Patent No.: US 7,380,930 B2
(45) Date of Patent: Jun. 3, 2008

(54) CONNECTION

(75) Inventors: Axel Huegle, Furtwangen (DE); Herbert Kirner, Villigen-Schwenningen (DE); Torsten Wahler, Bad Duerrheim (DE)

(73) Assignee: Siemens Aktiengesellschaft, Munich (DE)

( * ) Notice: Subject to any disclaimer, the term of this patent is extended or adjusted under 35 U.S.C. 154(b) by 124 days.

(21) Appl. No.: 10/554,207

(22) PCT Filed: Mar. 23, 2004

(86) PCT No.: PCT/EP2004/003070

§ 371 (c)(1),
(2), (4) Date: Oct. 24, 2005

(87) PCT Pub. No.: WO2004/099631

PCT Pub. Date: Nov. 18, 2004

(65) Prior Publication Data

US 2006/0209157 A1 Sep. 21, 2006

(30) Foreign Application Priority Data

May 12, 2003 (DE) ................................ 103 21 248

(51) Int. Cl.
*B41J 29/13* (2006.01)
(52) U.S. Cl. ..................................................... 347/108
(58) Field of Classification Search ................ 347/222, 347/108, 138, 152, 170; 400/641
See application file for complete search history.

(56) References Cited

U.S. PATENT DOCUMENTS 3,925,956 A    12/1975  Atkinson et al.
4,644,368 A *   2/1987  Mutz ........................ 346/33 D
6,392,677 B1 *  5/2002  Lais ......................... 346/33 D
6,414,704 B1 *  7/2002  Yamashita .................. 347/222
6,437,815 B1 *  8/2002  Burkart ..................... 347/222
6,834,950 B2 * 12/2004  Hugle ....................... 347/108
2004/0021763 A1 * 2/2004  Huegle ...................... 347/222

(Continued)

FOREIGN PATENT DOCUMENTS

CH          106147       8/1924

(Continued)

OTHER PUBLICATIONS

Derwent Abstract—DE-202 02 837 U1; Jun. 27, 2002; Buderus Guss GmbH, D-35576 Wetzlar, Germany.

(Continued)

*Primary Examiner*—Manish S. Shah
*Assistant Examiner*—Mark J Stevenosky, Jr.

(57) ABSTRACT

A connection of two components is disclosed that abut on the faces thereof. With this connection, it is possible to create a stable connection, particularly of flat components, with a high level of precision of the position with regard to one another and with a preferred accessibility in the space around the plane extending from the adjacent adjoining faces of the components. Both components each have a half borehole with encircling collars; a fastening device that extends through the complete borehole and a nut having a conical recess which rests tightly against the collars so that the first component is fastened to the second component in a positive manner. It is further possible to provide a fastening of guiding elements to a middle base support that, in essence, overlaps the support at least occasionally and is effected by the connection.

7 Claims, 6 Drawing Sheets

U.S. PATENT DOCUMENTS

2006/0209157 A1* 9/2006 Huegle et al. .............. 347/108

FOREIGN PATENT DOCUMENTS

| DE | 198 07 332 A1 | 8/1998 |
| DE | 202 02 837 U1 | 6/2002 |
| DE | 102 41 574 A1 | 3/2004 |
| EP | 1 052 514 A1 | 11/2000 |
| GB | 2 062 800 A | 5/1981 |
| JP | 102 39 089 A | 9/1998 |

OTHER PUBLICATIONS

Derwent Abstract—EP-1 052 514 A1; Nov. 15, 2000; Mannesmann VDO Aktiengesellschaft, D-60388 Frankfurt am Main, Germany.

Derwent Abstract—DE-198 07 332 A1; Aug. 27, 1998; Yazaki Corp, Tokyo, Japan.

* cited by examiner

CONNECTION

BACKGROUND OF THE INVENTION

The invention relates to a housing for a printer of a motor vehicle tachograph, having a basic housing body and a support which is designed as an insert, can be moved at least partly out of the housing and has at least one guide which comprises at least two first guide elements which are arranged on and fastened to the support on two opposite sides, and two second guide elements which correspond to the first guide elements on the support are arranged on both sides of the support, with the result that the support is guided by means of the guide during a movement in or against an insertion direction.

New fastening techniques have been continually developed from time immemorial given the correspondingly wide range of possibilities of connecting two adjoining components to one another. In spite of the widely advanced development of the prior art, the known solutions have until now proved inadequate for specific fastening tasks. Reasons for this include the increasing requirements for compactness, automatability of the assembly and precision in the connection technique. Thus difficulties often arise during fully automated assembly sequences in interconnecting two adjoining components where there is poor accessibility with low positional tolerance. This is particularly the case when the accessibility of the connection is substantially only possible in the plane defined by the two boundary surfaces to be joined together. Recourse is frequently had in such a case to a flange connection. However, this has the disadvantage that bulky flanges have to be integrally formed on the components to be connected and corresponding arrangements enabling fastening elements to be applied have to be provided on these flanges. Moreover, such connections are also not suitable for fully automated assembly. This problem always arises when flat abutting components have to be firmly connected.

European patent application EP 1 052 514 A1 has already disclosed a housing of the initially mentioned type, although this housing unfavorably transfers inaccuracies to the support guide, which leads to the print quality of the printing device described being impaired. A similar arrangement can also be taken from laid-open specification DE 198 07 332 A1, in which lateral guide rails form a constituent part of a U-shaped guide component which has to be designed to be deformable for assembly purposes, impairing the precision.

SUMMARY OF THE INVENTION

The invention is therefore based on the object of providing a connection which allows stable fastening of two adjoining components, in particular flat components, with a high degree of accuracy of the position with respect to one another and preferred accessibility in the space around the plane defined by the adjacent adjoining end faces of the components.

To achieve the object, the invention proposes a housing of the initially mentioned type having the features of claim 1. The subclaims contain advantageous developments of the invention.

The socket expediently encompasses the collars provided on the two components, with the result that the fastening arrangement exclusively secures the first fastening element at the intended location, transverse forces and tensile forces are introduced into the first fastening element by the collars and are absorbed to a significant extent by said fastening element as tensile loading. The fastening arrangement experiences load relief and may accordingly be dimensioned sparingly. The connection according to the invention advantageously not only fastens the components to one another but also centers them with respect to one another. In particular, a relative movement in the plane defined by the boundary surfaces of the two components is prevented.

An advantageous development of the invention provides that the collar is designed to be conical on the outer circumference, with the result that a force which brings together the two half bores is produced when securing the fastening arrangement. The conicity of the collar or of the socket of the first component results in the fact that when securing the fastening arrangement the two adjoining components advantageously experience a respective force bringing them together. By virtue of the conicity, the socket in the first component does not have to be exactly matched to the shape of the collars of the two partial bores in order to produce a firm connection. Centering is produced in a particularly exact manner here because the connection is free from play in the secured state.

A cone angle of the socket or of the collars of about 45°+/−30° is particularly advantageous. A ratio of the length of the conical section to the diameter of the half bores of about 0.5+/−0.3 is expedient. A comparatively steep cone angle is recommended for a particularly firm fit.

The invention also relates to a fastening element for a connection of the above-described type, which comprises a basic body having a bore which is provided at least partially with an internal thread and the bore is widened conically without a thread in a first section on the entry side. The conical widening expediently has a cone angle of about 45°+/−30° and a depth in the bore of about 0.5+/−0.3 of the diameter. The fastening element, or first fastening element of the abovementioned connection, is expediently produced from metal material for high tensile loading.

To introduce a torque into the fastening element, it is appropriate if the basic body comprises arrangements, in particular flats disposed tangentially to the bore, for inserting a tool for introducing a torque into the basic body in the direction of the central axis of the bore.

The fastening element according to the invention advantageously combines a number of functions in one component. On the one hand, it assumes the function of a nut or else a screw in the conventional sense, for example for fastening the adjoining components to be connected to one another on a common base component, for example a housing wall, and, on the other hand, the two adjoining components are braced against one another and fastened to one another.

The aforementioned fastening element, or the first fastening element, is expediently complemented by a screw or a threaded bolt mounted on a base element, for example a threaded bolt mounted on a housing wall, to form the connection according to the invention.

The connection according to the invention, or the fastening element according to the invention, is particularly advantageously used in a housing, likewise forming the subject of the invention, in particular in the housing for a printer of a motor vehicle tachograph, having a support which is designed as an insert, can be moved at least partly out of the housing and has at least one guide which comprises at least two first guide elements which are arranged on the support and comprises two second guide elements which correspond to the first guide elements on the support, with the result that the support is guided by means of the guide during a movement in or against an insertion direction, the second guide elements being fastened to a central base support and substantially overlapping the support at least periodically. Instead of a hitherto customary fastening of the second guide elements to the housing, according to the invention the second guide elements are fastened to the central base support, with the result that the generally high inaccuracies of the housing have no effect on the position of the second guide elements. As regards the relative position of the two second guide elements with respect to one another, according to the invention only the accuracy of the central base support remains crucial.

A further advantage of the arrangement of a central base support according to the invention between the two second guide elements is provided upon assembly, during which all of the components directly connected to the central base support and to the second guide elements can first be assembled in a fully automated manner and form a unit which can be handled separately. These components can in this way also be tested independently of the overall arrangement.

It is appropriate for this purpose to provide the two second guide elements with suitable connection elements which, together with corresponding mating pieces on the central base support, ensure that none of the components can be lost. Latching or clip connections are highly suitable for this purpose, if appropriate in combination with preferably cylindrical or conical guides.

Such an arrangement is particularly expedient if a printer is arranged in the housing which comprises a media unit, which is fastened to the support, for receiving the medium which is to be printed on. The requirements for comfort when replacing the medium to be printed on require that the printer comprises a printing unit which is fastened to the base support.

Such a combination of support, base support, media unit, feed unit and printing unit results in the fact that the feed unit, which can be moved with respect to the static printing unit, has to be guided with high precision in order that the printed image is not unacceptably impaired in terms of quality as a result of incorrect positioning of the printing head with respect to the feed unit. The arrangement according to the invention of a central base support which substantially overlaps the support and on which the second guide elements are fastened is particularly high for the relative position of the printing unit with respect to the feed unit.

The combination of the connection according to the invention with the above-described arrangement of guide elements and the base support is particularly advantageous in that a first guide element is fastened to the base support by means of a connection in which at least the first guide element has a first half bore with a first collar, the base carrier has a second half bore, with a second collar, corresponding to the first half bore, the two half bores complement one another to form a complete bore in the joined-together state, a fastening arrangement extends through the complete bore and comprises a first fastening element with a socket which corresponds in form to the collars and which at least partially encloses the collars, and the first guide element is thereby fastened to the base support in a positive manner. This arrangement has particular advantages with respect to the strength of the connection, the number of the structural elements, the required accessibility of the connection for fixing the structural elements and the positional precision, in particular of the guide elements on the base support.

These advantages are further enhanced if the collar is designed to be conical on the outer circumference, with the result that a force which brings together the two half bores is produced when securing the fastening arrangement.

The aforementioned advantages apply particularly in the case of a tachograph having a housing of the aforementioned type.

BRIEF DESCRIPTION OF THE SEVERAL VIEWS OF THE DRAWINGS

The invention will be explained in more detail below with the aid of a specific exemplary embodiment for illustration purposes, with reference to drawings, in which.

DETAILED DESCRIPTION OF THE INVENTION

Figure 1:
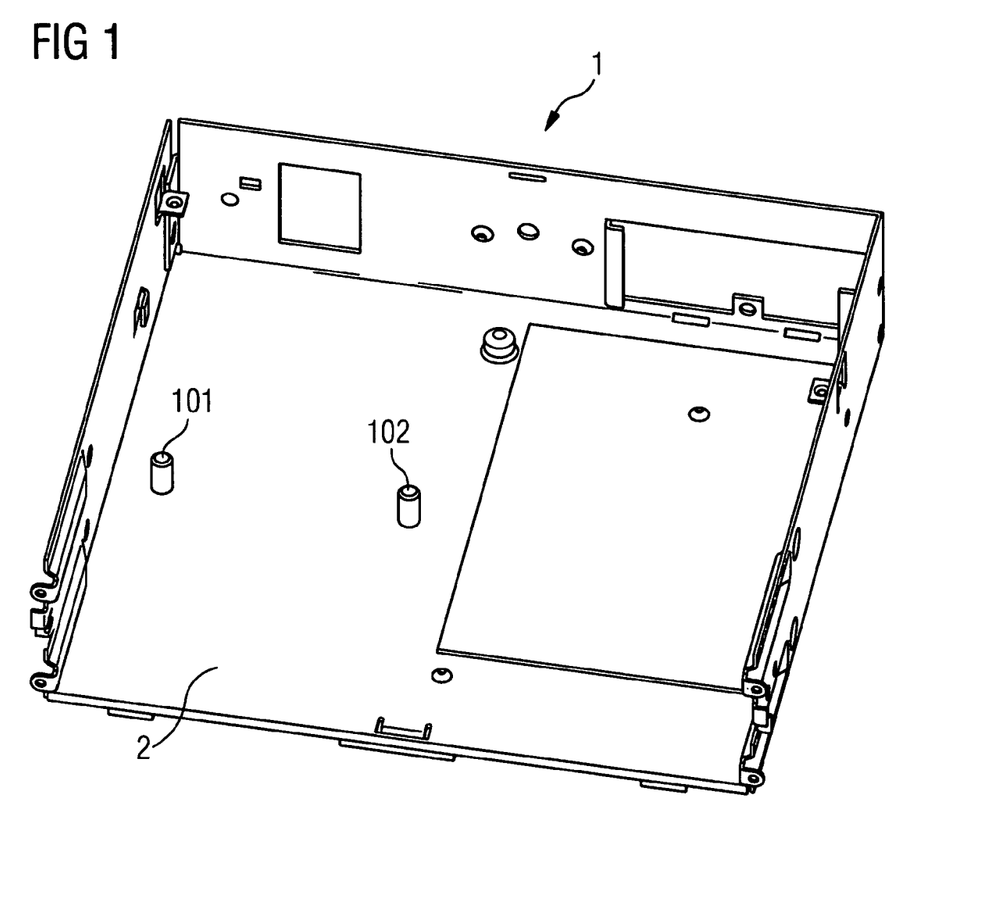
FIG. 1 shows a perspective representation of a basic housing body.

In FIG. 1 the housing or the basic housing body 1 is provided with the reference number 2. Two threaded bolts 101, 102 are firmly mounted on a wall 2 of the bottom of the basic housing body 1. The basic housing body 1 consists of metal.

Figure 2:
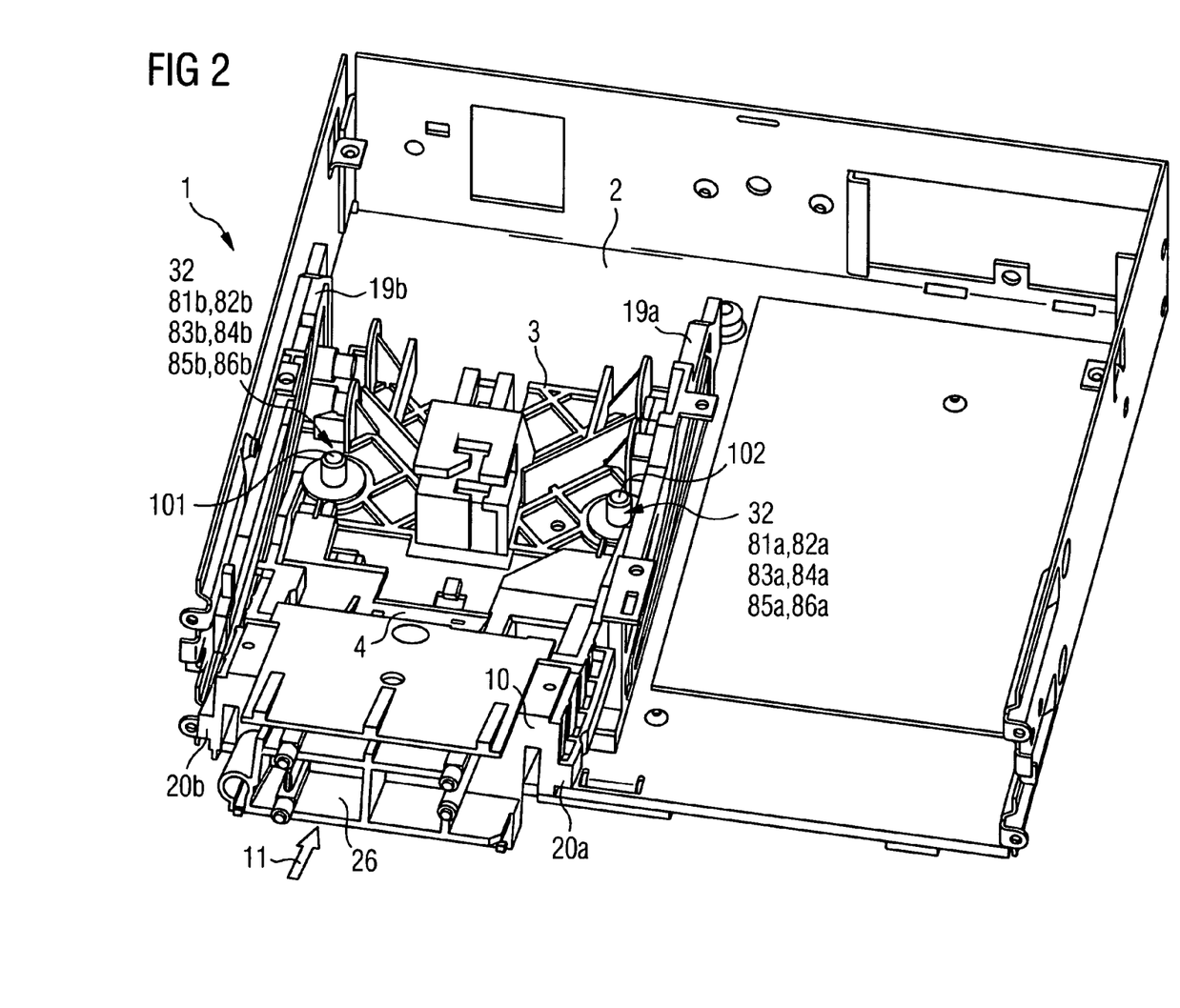
FIG. 2 shows a perspective representation of a basic housing body with a base support with guide elements situated therein.

In the representation shown in FIG. 2, parts of a printer are inserted in the basic housing body 1. These parts are a base support 3 with a printing unit 4 which is mounted on the base support 3 and which comprises a printing head, which cannot be seen in the representation. First guide elements 19a, b arranged on both sides of the base support belong to second guide elements 20a, 20b which are arranged on both sides of a support 10 and which correspond in form to the first guide elements 19a, b. The support 10 is guided displaceably in the first guide elements 19a, 19b by means of the second guide elements 20a, 20b along a circular path in an insertion direction 11 and counter to the insertion direction 11. The surfaces of the guide elements 19a, 19b, 20a, 20b which bear against one another are designed as sliding bearings.

The base support 3 has two second half bores 84a, 84b which, together with two first half bores 81a, 81b on the first guide elements 19a, 19b, complement one another to form a respective complete bore 85a, 85b. The first and second half bores 81a, 81b, 84a, 84b have a first collar 82a, 82b or second collar 83a, 83b which is in each case designed to be conical on its outer circumference.

Figure 3:
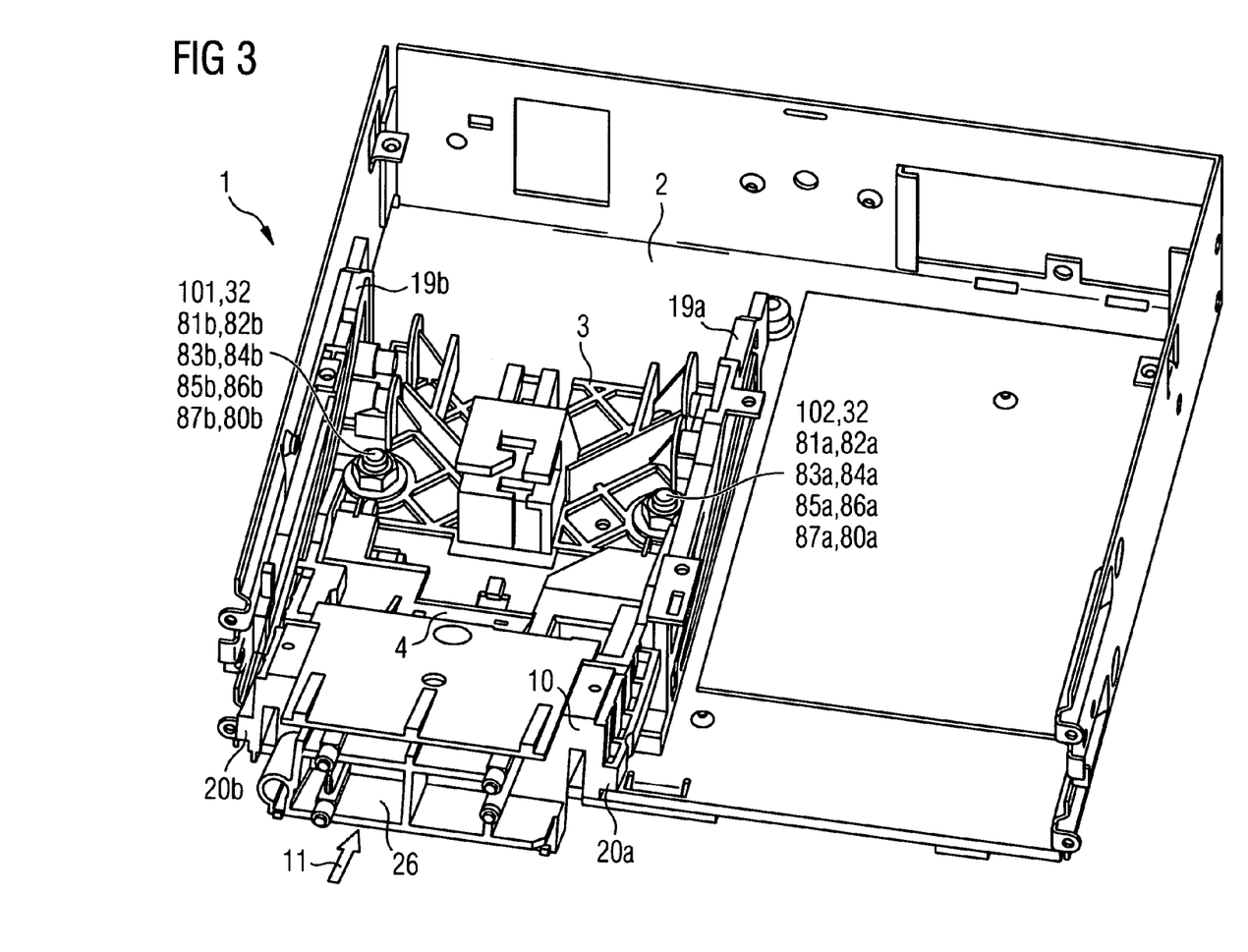
FIG. 3 shows a perspective representation of a basic housing body with base support, guide elements and fastening elements situated therein.

As represented in FIG. 3, a first fastening element 87a, 87b designed as a conical nut 80a, 80b, which will be explained further in the text below, can be screwed onto the threaded bolts 101, 102 respectively. The adjoining components, namely the base support 3 and first guide elements 19, are in this way fastened to one another by means of a connection 32 according to the invention.

Figure 4:
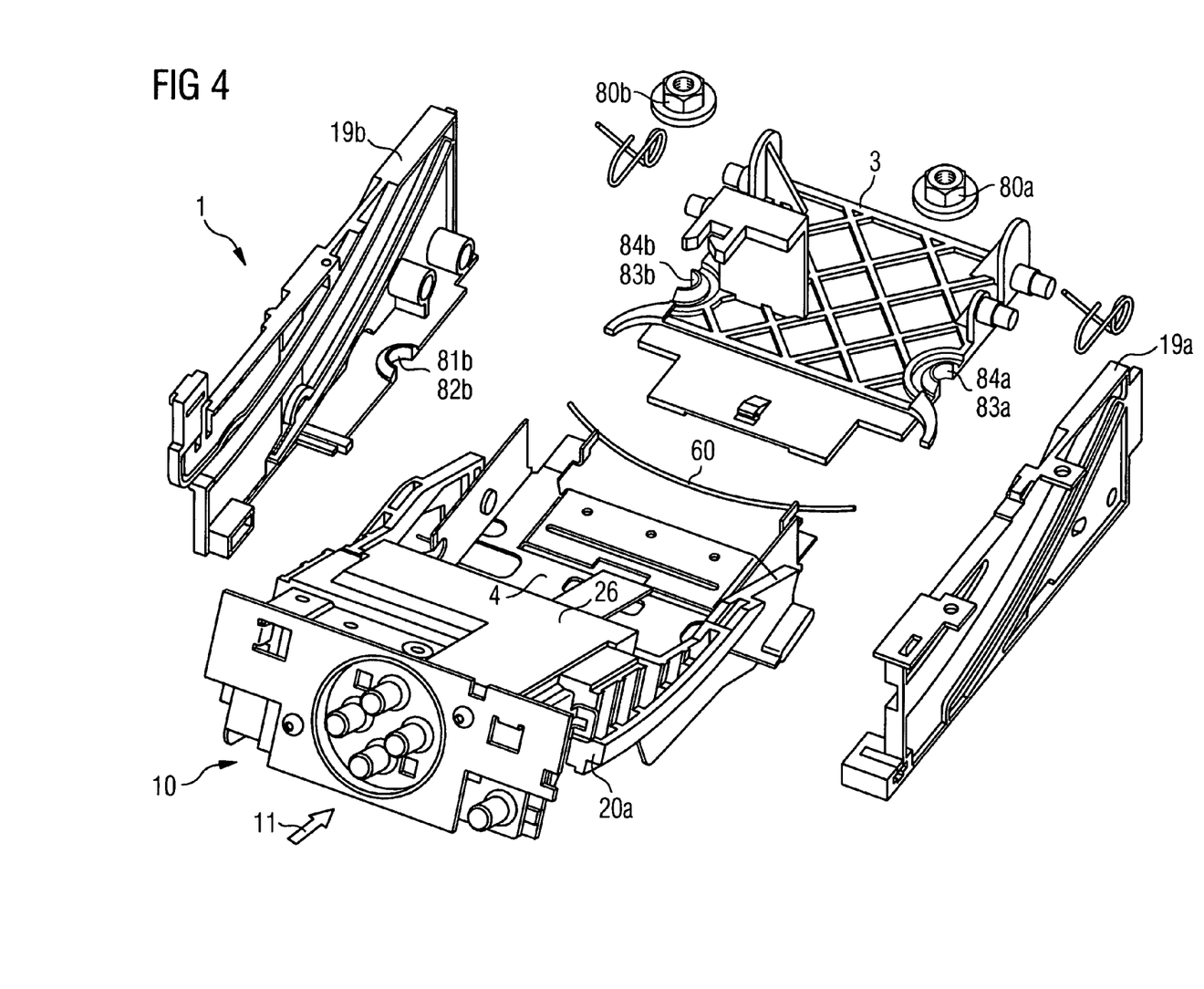
FIG. 4 shows a perspective representation of a base body, with guide elements, a support with feed unit and printing module, in an exploded view.
Figure 5:
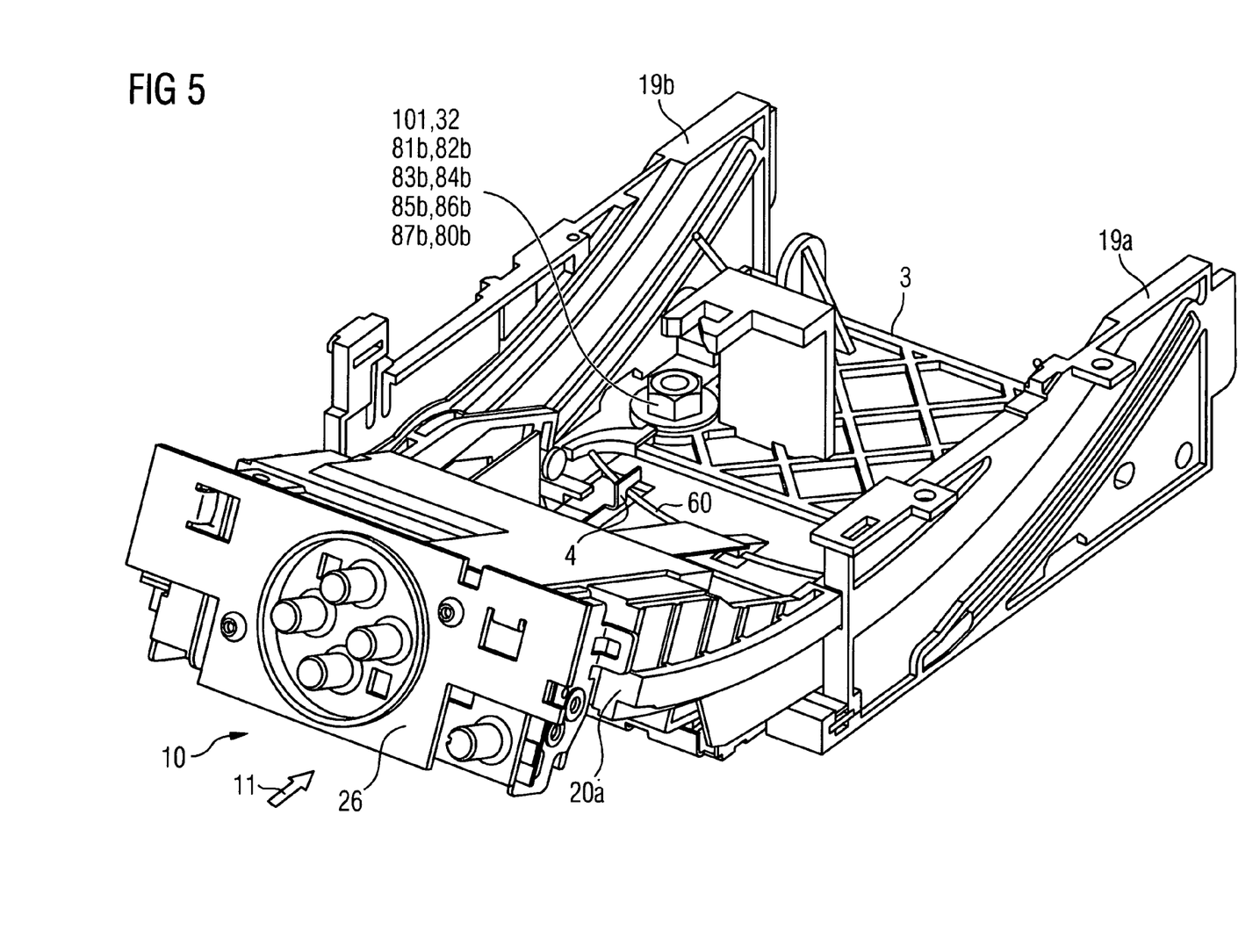
FIG. 5 shows a perspective representation of the components represented in FIG. 4 as an assembled structure.

FIGS. 4 and 5 again show, in an exploded view and as an assembled structure, the components, including further components, arranged in the basic housing body 1 as shown in the representations of FIGS. 2 and 3. The printing unit 4 is mounted resiliently on the base support 3 by means of an elastic element, namely a torsion spring 60, with the result that when the support 10 is inserted the printing unit 4 is aligned on centering elements (not depicted in detail) of the support 10 and is in this way braced so as to compensate for tolerances which are unfavorable to the print quality. A reproducible position of the printing unit 4 with respect to the support 10 and to a feed unit 5 and media unit 26 mounted on the support 10 is thus always ensured. This guarantees excellent print quality while at the same time ensuring a comfortable replacement of the printing media.

Figure 6:
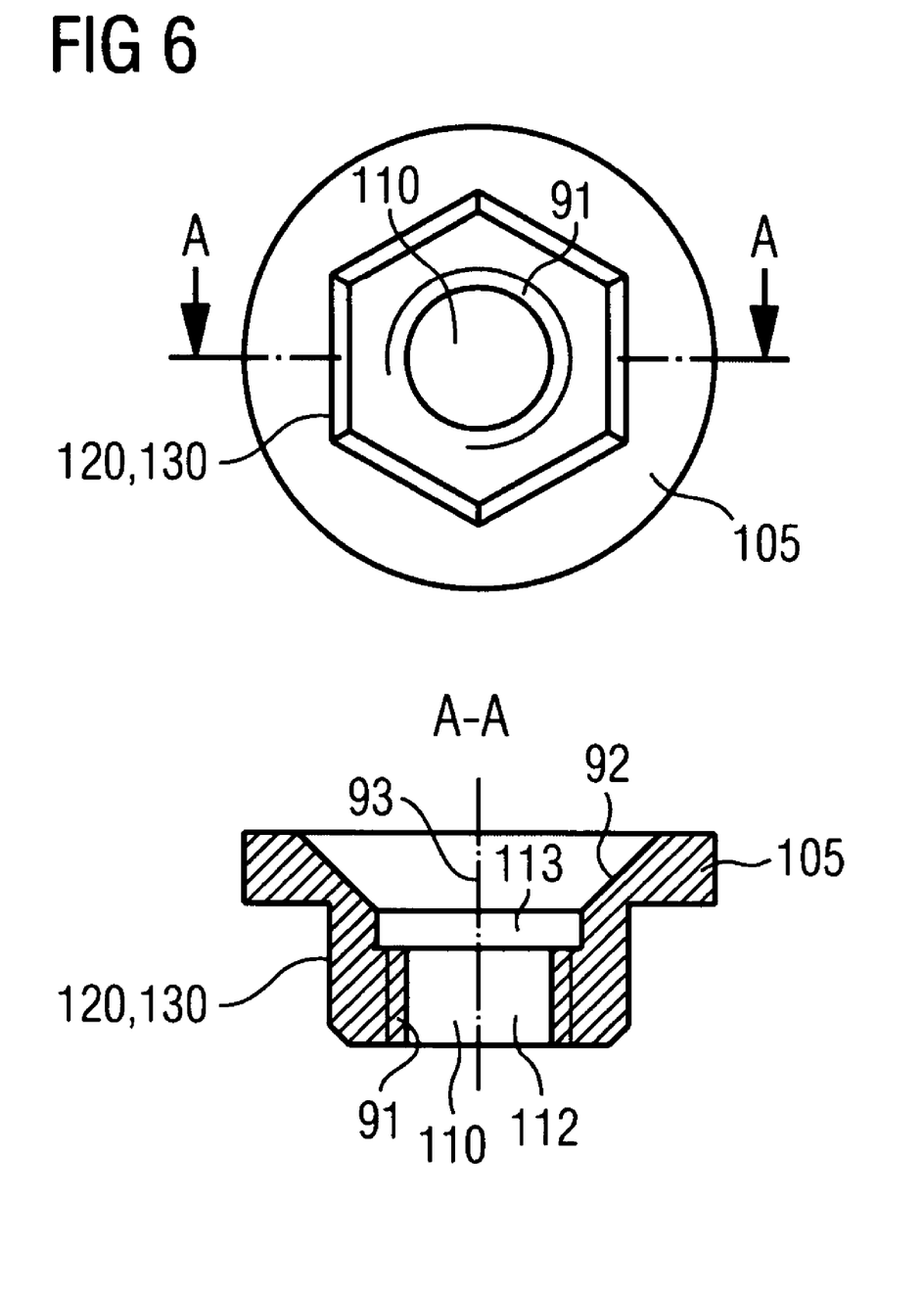
FIG. 6 shows a representation of a conical nut.

The representation in FIG. 6 shows the first fastening element 87 or the conical nut 80. This substantially comprises a basic body 105 which is provided with a bore 110 along a central axis 111. The bore 110 is conically widened in a first section 92 and the bore 110 is provided with an internal thread in a second section 112. A cylindrical third section 113 is situated between the first section 92 and the second section 112. The conically widened first section 92 has a depth of about 70% of the bore diameter. The second section 112 provided with the internal thread 91 extends approximately to the same degree. Flats 130 for applying a tool are arranged on an outer circumference 120 of the basic body 105.

The invention claimed is:

1. A housing for a printer of a motor vehicle tachograph, comprising:
   a basic housing body;
   a support arranged to be moved at least partly out of the housing, the support comprising at least one guide having:
   at least two first guide elements arranged on and fastened to the support on two opposite sides, and
   two second guide elements, corresponding to the first guide elements on the support, arranged on both sides of the support such that the support is guided by means of the guide during a movement in or against an insertion direction, and
   a central base support which substantially overlaps the support,
   wherein the second guide elements are fastened to the central base support,
   wherein the first guide elements and the central base support are fastened and braced against one another to the basic housing body,
   wherein the first guide elements are fastened to the base support by means of a connection in which a first guide element has a first half bore with a first collar,
   wherein the base support has a second half bore, with a second collar corresponding to the first half bore,
   wherein the two half bores complement one another to form a complete bore in a joined-together state,
   wherein a fastening arrangment extends through the complete bore, the arrangement comprising a first fastening element with a socket which corresponds in form to the collars and which at least partially encloses the collars; and
   wherein said first guide element is thereby fastened to the base support in a positive manner.

2. The housing according to claim 1, further comprising:
   a printer arranged in the housing; and
   a media unit fastened to the support for receiving medium which is to be printed on.

3. The housing according to claim 2, wherein the printer comprises a printing unit which is fastened to the base support.

4. The housing according to claim 1, wherein the support is arranged at least partially in the manner of a drawer between the first guide elements.

5. The housing according to claim 1, wherein the collar is conical on an outer circumference such that a force which brings together the two half bores is produced when securing the fastening arrangement.

6. The housing according to claim 2, wherein the media unit comprises a receptacle for a paper roll and a feed unit for paper of the paper roll.

7. The housing according to claim 1, wherein the support is arranged to be moved relative to the printing unit and in the insertion direction into an operating position and counter to the insertion direction out of an operating position.

* * * * *